US009028255B2

(12) United States Patent
Massaro (10) Patent No.: US 9,028,255 B2
(45) Date of Patent: May 12, 2015

(54) METHOD AND SYSTEM FOR ACQUISITION OF LITERACY

(76) Inventor: Dominic William Massaro, Santa Cruz, CA (US)

( * ) Notice: Subject to any disclaimer, the term of this patent is extended or adjusted under 35 U.S.C. 154(b) by 257 days.

(21) Appl. No.: 13/253,335

(22) Filed: Oct. 5, 2011

(65) Prior Publication Data

US 2012/0088211 A1    Apr. 12, 2012

Related U.S. Application Data

(60) Provisional application No. 61/390,259, filed on Oct. 6, 2010.

(51) Int. Cl.
G09B 17/00    (2006.01)

(52) U.S. Cl.
CPC .................................. G09B 17/006 (2013.01)

(58) Field of Classification Search
CPC ...................................................... G09B 17/00
USPC .................................. 434/178, 185, 44, 157
See application file for complete search history.

(56) References Cited

U.S. PATENT DOCUMENTS

| | | |
|---|---|---|
| 5,562,453 A | 10/1996 | Wen |
| 5,648,789 A | 7/1997 | Beadles et al. |
| 5,741,136 A | 4/1998 | Kirksey et al. |
| 5,799,267 A | 8/1998 | Siegel |
| 5,799,279 A | 8/1998 | Gould et al. |
| 5,885,083 A | 3/1999 | Ferrell |
| 6,005,536 A | 12/1999 | Beadles et al. |
| 6,009,397 A | 12/1999 | Siegel |
| 6,022,222 A | 2/2000 | Guinan |
| 6,062,863 A | 5/2000 | Kirksey et al. |
| 6,076,059 A | 6/2000 | Glickman et al. |
| 6,113,394 A | 9/2000 | Edgar |
| 6,155,834 A | 12/2000 | New, III |
| 6,160,986 A | 12/2000 | Gabai et al. |
| 6,227,863 B1 | 5/2001 | Spector |
| 6,273,726 B1 | 8/2001 | Kirksey et al. |
| 6,377,925 B1 | 4/2002 | Greene, Jr. et al. |
| 6,405,167 B1 | 6/2002 | Cogliano |
| 6,517,351 B2 | 2/2003 | Spector |
| 6,579,100 B1 | 6/2003 | Clark et al. |
| 6,632,094 B1 | 10/2003 | Falcon et al. |
| 6,669,478 B2 | 12/2003 | Edwards et al. |
| 6,884,076 B2 | 4/2005 | Clark et al. |
| 6,986,663 B2 | 1/2006 | Budra et al. |
| 7,013,009 B2 | 3/2006 | Warren |

(Continued)

OTHER PUBLICATIONS

Report of the National Early Literacy Panel, "Developing Early Literacy", 2008.

*Primary Examiner* — Xuan Thai
*Assistant Examiner* — Robert P Bullington (57) ABSTRACT

A computer-implemented method for enabling a child to learn to read, including maintaining a data store with information that characterizes the reading capabilities of children, receiving a stream of sensor data from one or more input devices, the sensor data representing the speech of a person speaking, the person being either an adult or a child, or a sequence of scenes, identifying a meaningful utterance or a meaningful scene from the stream of sensor data, representing the meaningful utterance or meaningful scene in written text using words and grammar appropriate to the reading level of the child, based on information stored in the data store, providing the output text to a display device for presentation to the child, and receiving user feedback.

22 Claims, 8 Drawing Sheets

(56) References Cited

U.S. PATENT DOCUMENTS

| | | |
|---|---|---|
| 7,052,278 B2 | 5/2006 | Johnson et al. |
| 7,054,804 B2 | 5/2006 | Gonzales et al. |
| 7,110,945 B2 | 9/2006 | Cogliano |
| 7,150,630 B2 | 12/2006 | Budra et al. |
| 7,221,405 B2 | 5/2007 | Basson et al. |
| 7,563,099 B1 | 7/2009 | Iftikhar |
| 7,689,407 B2 | 3/2010 | Yang et al. |
| 7,792,575 B2 | 9/2010 | Fujimaki et al. |
| 7,991,607 B2 | 8/2011 | Zhang et al. |
| RE43,633 E * | 9/2012 | Bookman et al. ............ 704/3 |
| 2002/0087525 A1* | 7/2002 | Abbott et al. ............ 707/3 |
| 2003/0035567 A1* | 2/2003 | Chang et al. ............ 382/115 |
| 2006/0293874 A1* | 12/2006 | Zhang et al. ............ 704/2 |
| 2008/0140401 A1* | 6/2008 | Abrash et al. ............ 704/251 |

* cited by examiner

METHOD AND SYSTEM FOR ACQUISITION OF LITERACY

PRIORITY REFERENCE TO RELATED APPLICATIONS

This application claims benefit from U.S. Provisional Patent Application No. 61/390,259, filed on Oct. 6, 2010, by inventor Dominic William Massaro, entitled DIGITAL LEARNING OF WRITTEN LANGUAGE WITHOUT FORMAL INSTRUCTION.

FIELD OF THE INVENTION

The subject invention relates to written language and its acquisition. More specifically, the invention is directed towards a device and system that enables illiterate infants, toddlers, and young children to learn to read and acquire literacy at an early age before formal schooling begins.

BACKGROUND OF THE INVENTION

Most researchers and educators contend that spoken language is seamlessly acquired from birth onward by natural interactions with persons whereas the acquisition of written language requires formal instruction and schooling. In contrast, the theory upon which the present invention is based is that written language understanding, or literacy, can be acquired seamlessly if it is constantly available in the same way that spoken language is available.

Many scientists and researchers believe that children are not ready to read until at least the age of five. Many developmental psychologists and neuroscientists claim that early reading before school age is not biologically or behaviorally possible.

Most reading specialists believe that reading must be taught via speech and, therefore, should not be taught until spoken language has been mastered to a significant degree. Given this pedagogical framework, written language is not usually presented for reading until the child gains expertise in spoken language and attends school for formal instruction. When written language is introduced, it is in the context of directed instruction that usually involves building phonological awareness, learning the alphabet, learning sight words, and sounding out words.

Popular commercial products for learning to read generally require instructional pedagogy and practice wherein the learning process is highly contingent on the child's understanding of spoken language. For example, some companies market early reading products that make the learning of written words contingent on pairing them with spoken language.

Evidence from behavioral and neuroscience has documented so-called critical periods in audition, vision, and language. These critical periods represent periods in a child's lifespan that are crucial for development. In contrast to later in life, the brains of young children are especially plastic, or malleable. Deprivation of sensory or linguistic input during this time leads to a substantial deficit of the sensory system or in the specific language ability of the child. Therefore, minimizing appropriate written input during this period could put the child at a disadvantage in learning to read when schooling begins.

Thus, it would be advantageous to provide a system in which written language is provided to the developing child soon after birth at an appropriate level and in an appropriate format. Such a system would automatically recognize spoken language as well as the visual elements of the environment in which speech is occurring. It would then present some written description of the speech and/or the scene to the child. Moreover, it would be advantageous for reading acquisition if the written description were appropriate to the child's level of understanding.

SUMMARY OF THE DESCRIPTION

The present invention exploits current knowledge and developments in behavioral science and technology to provide methods for automatically recognizing the meaning inherent in the illiterate child's experience, and describing that experience in a written language form that is appropriate to the perceptual, cognitive, and linguistic capabilities of the child.

The present invention is intended to extract the relevant meanings embedded in a child's experience and to describe some of that experience in written language. It uses two methods to recognize and convert the child's experience of spoken language into written language. The first method is to recognize the speech that is being spoken during the experience. The second method is to recognize the scene, the objects, and the actions it contains.

The present invention analyzes a caregiver's and/or child's speech to determine the meaning of the speech. In one embodiment, the present invention uses acoustic recognition of speech supplemented by methods that track a caregiver's facial movements and gestures to help recognize what is being spoken by the person talking. A modified form of the recognized speech is then presented in writing to children who have not yet mastered reading.

In one embodiment, the present invention uses methods such as face and gesture recognition to identify the person talking.

Using scene and object analysis as well as analysis of the actions of a caregiver and the child the subject invention determines scenes from the environment that are currently meaningful to the child. This meaning is presented in writing at a level appropriate to children during their preschool years.

In certain embodiments, vocabulary and grammar of written text are adjusted to the level of the child. In other embodiments, the format of written text is adjusted to the level of the child.

In one embodiment, a computer-implemented method is provided for enabling a child to learn to read, including maintaining a data store with information that characterizes the reading capabilities of children, receiving a stream of sensor data from one or more input devices, the sensor data representing the speech of a person speaking, the person being either an adult first person, or a child second person, identifying a meaningful utterance from the stream of sensor data, representing the utterance in written text using words and grammar appropriate to the reading level of the child, based on information stored in the data store, and providing the output text to a display device for presentation to the child.

In yet another embodiment, the subject invention provides a computer-implemented method for enabling a child to learn to read, including maintaining a data store with information that characterizes the reading capabilities of children, receiving a stream of sensor data from one or more input devices, said sensor data representing a sequence of scenes, each scene including an adult first person and a child second person, identifying a meaningful scene from the sequence of scenes, representing the meaningful scene in written text using words and grammar appropriate to the reading level of the child, based on information stored in the data store, and providing the written text to a display device for presentation to the child.

BRIEF DESCRIPTION OF THE DRAWINGS

The best way to understand and appreciate the subject invention is in conjunction with the attached drawings. The drawings are summarized briefly below and then referred to in the Detailed Description that follows.

DETAILED DESCRIPTION

The drawings are now used to describe the subject invention, but it should be observed that it is possible to implement the innovation without these specific details. The description provides specific details to help the reader understand the invention.

Many of the terms used in this description, such as component and system, refer to computers, including their hardware and software. Other terms are specifically defined.

One objective of the invention is to create an environment for a developing child in which written text is constantly available and readable to enable the acquisition of written language automatically without the child's intention and without formal instruction.

Another objective of the invention is to exploit the rapid brain growth that occurs before a child is 6 years old by making written language constantly available to a child from soon after birth onward.

Another objective of the invention is to solve a previously believed unsolvable problem of providing a method for learning to read without formal instruction.

The present invention creates an environment for the developing child, or other illiterate person, in which written text is constantly available.

The present invention provides means of recognizing speech and scenes, objects, and actions and transforming this input into a written text form that can be appropriately displayed to a recipient who is not fully literate.

As used herein the following terms have the meanings given below:

Caregiver—means a person responsible for and interacting with a child. In the context of the present invention, caregiver also means a person who is talking and/or performing various actions.

Reader—means a person that is the intended recipient of written language text presented by the subject invention. In some cases, the reader may also be listening to or spoken to by a caregiver. In other cases, the reader may be looking at objects or scenes or engaged in a particular action. While in a preferred embodiment, a reader is typically a pre-literate child, the invention is not so limited.

Caregiver/Reader environment—means the acoustic, visual and other perceptual information relating to the interaction between the caregiver and reader. For example, the caregiver/reader environment includes the acoustic data from a caregiver or reader's speech, their facial movements and bodily gestures, and their physical environment.

Talker—refers to a person that is speaking within the caregiver reader environment. For example, a talker may be a caregiver, a reader or another person. The term "talker" is typically used when the identity of the person talking is not yet known by the system.

Sensor data—means encoded information or input data from a device that captures data, typically using a sensor. Example capture devices include inter alia a digital camera, digital camcorder, voice recorder, bar code reader, GPS, microphone, tablet computer, personal computer, laptop computer and mobile phone or smart phone. Sensor data is presumed to represent more generally the properties of an environment such as an aspect of a person talking, i.e. a caregiver or reader, or a caregiver/reader environment. Sensor data from a type of input device, such as a camcorder, is referred to as a channel of sensor data. The present invention not only supports multiple simultaneous channels of sensor data, it relies on multiple channels for accuracy of performance.

Utterance—refers to speech consisting of any of syllables, words, phrases, or sentences uttered by a person talking.

Scene—refers to a situation involving a caregiver and child or the child alone.

Meaningful experience—refers to the meaning for a reader inherent in a spoken utterance or a scene. If a meaningful experience is currently happening then it is referred to as a current meaningful experience.

Integration—refers to the combination of data from several components in order to achieve speech or scene recognition.

In one embodiment of the subject invention, modified written transcriptions of both the caregiver's speech and the reader's speech are displayed. The words and grammar of these transcriptions are chosen to be appropriate to the perceptual, cognitive, and linguistic ability of the reader.

It may further be noted that in the case that a reader is a deaf child he/she might be at a disadvantage because he/she will not be hearing the spoken language from the caregiver corresponding to the written transcriptions. It should be noted, however, that the present innovation does not require that the reader hear speech in order to acquire written language.

Figure 1:
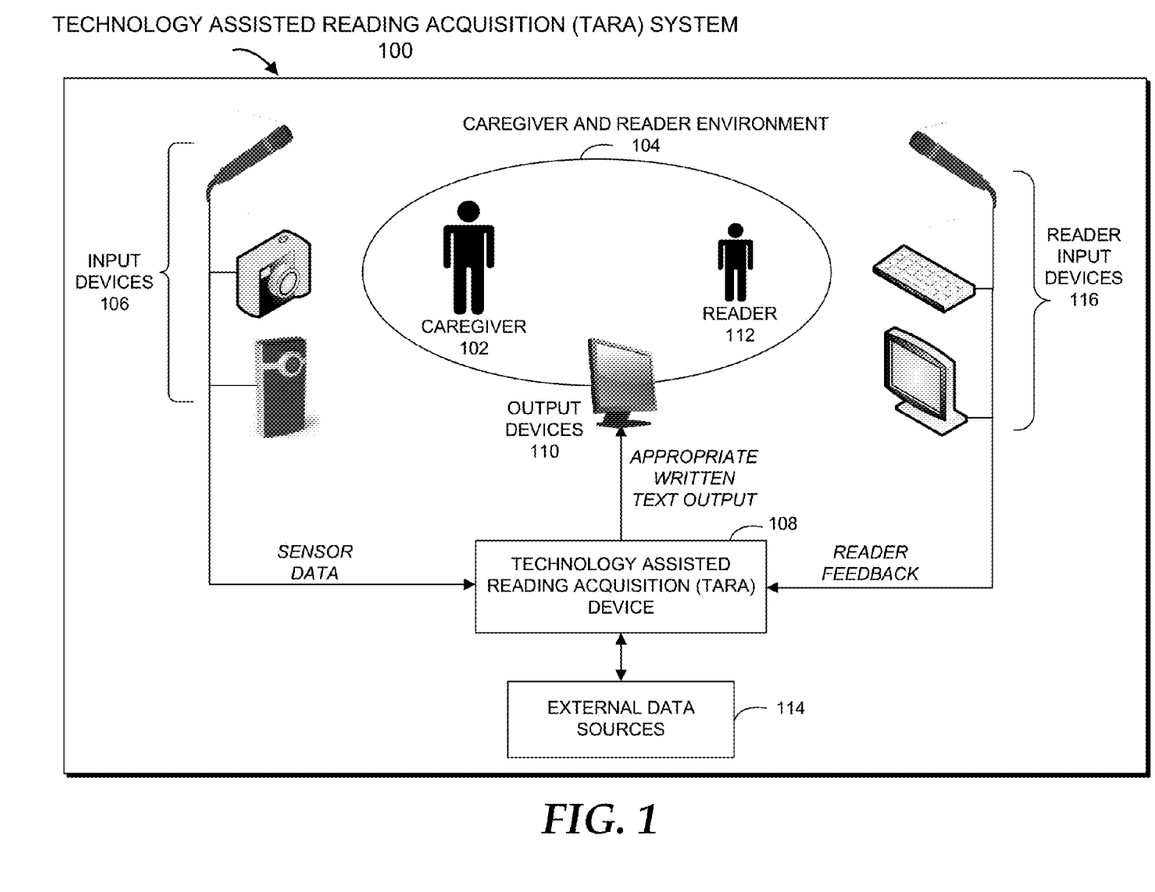
FIG. 1 illustrates a Technology Assisted Reading Acquisition (TARA) system that enables literacy acquisition, in accordance with an embodiment of the subject invention.

Referring now to the drawings, FIG. 1 illustrates a Technology Assisted Reading Acquisition (TARA) system 100 that that enables literacy acquisition, in accordance with one embodiment of the subject invention. System 100 includes one or more input devices 106 that capture information from a caregiver and reader environment 104 including speech from a caregiver 102 and a reader 112, as well as information about the scene and objects and actions therein. Each input device 106 provides one channel of sensor data as input to a TARA device 108. Typically, a sensor data channel is a digital data stream from an input device 106 that provides a specific data type, such as digital audio or digital video. A channel of sensor data typically provides live, or real-time, information that in some way relates to speech from caregiver 102 and/or reader 102, or information from caregiver/reader environment 104, and even from an environment in which a caregiver is not present.

TARA device 108 is a computing device that typically includes a processor, memory for programs and data and permanent data storage. Examples of types of devices that may be employed as a TARA device include mobile devices, smart phones, tablet computers, personal computers, desktop computers, and server computers. In addition, the functions and components of TARA device 108 may be split across multiple computers as, for example, one worn by the caregiver and one worn by the reader, or additionally one in the room and one worn by the reader.

In addition to sensor data, TARA device 108 may obtain information from external data sources 114 such as information about caregiver 102 or reader 112, the properties of caregiver and reader environment 104, and more generally information to facilitate the operation of TARA device 108.

TARA device 108 processes one or more channels of sensor data, obtains external data as necessary, identifies utterances or scenes, generates written text, appropriate to a reader 112, and displays the written text on one or more output devices 110 that can be seen or otherwise perceived by reader 112. Furthermore, TARA device 108 receives data from one or more reader input devices 116 that may include feedback or commands from either or both of reader 112 or caregiver 102.

TARA device 108 interprets the speech of caregiver 102 and outputs text that is visually, orthographically, semantically, and syntactically appropriate to the age and comprehension level of reader 112. In one embodiment, for example, the written output that the child sees might be a simplification of the spoken input. For example, the mother might say "Please give mom the toy." and the child might see "GIVE MOM TOY." In addition, the words might be presented one at a time at a slow rate.

In another embodiment, TARA device 108 can also process the speech of reader 112. In this case, TARA device 108 processes utterances from reader 112 and presents appropriate modifications in written form. For example, if the child says, "Mm mah mme," the written presentation might be "MOMMY."

In one embodiment, reader 112 can issue commands using reader input devices 116. For example, upon viewing some written text reader 112 might touch the display to indicate that he/she wishes to have the text displayed again, or have it spoken aloud.

Figure 2:
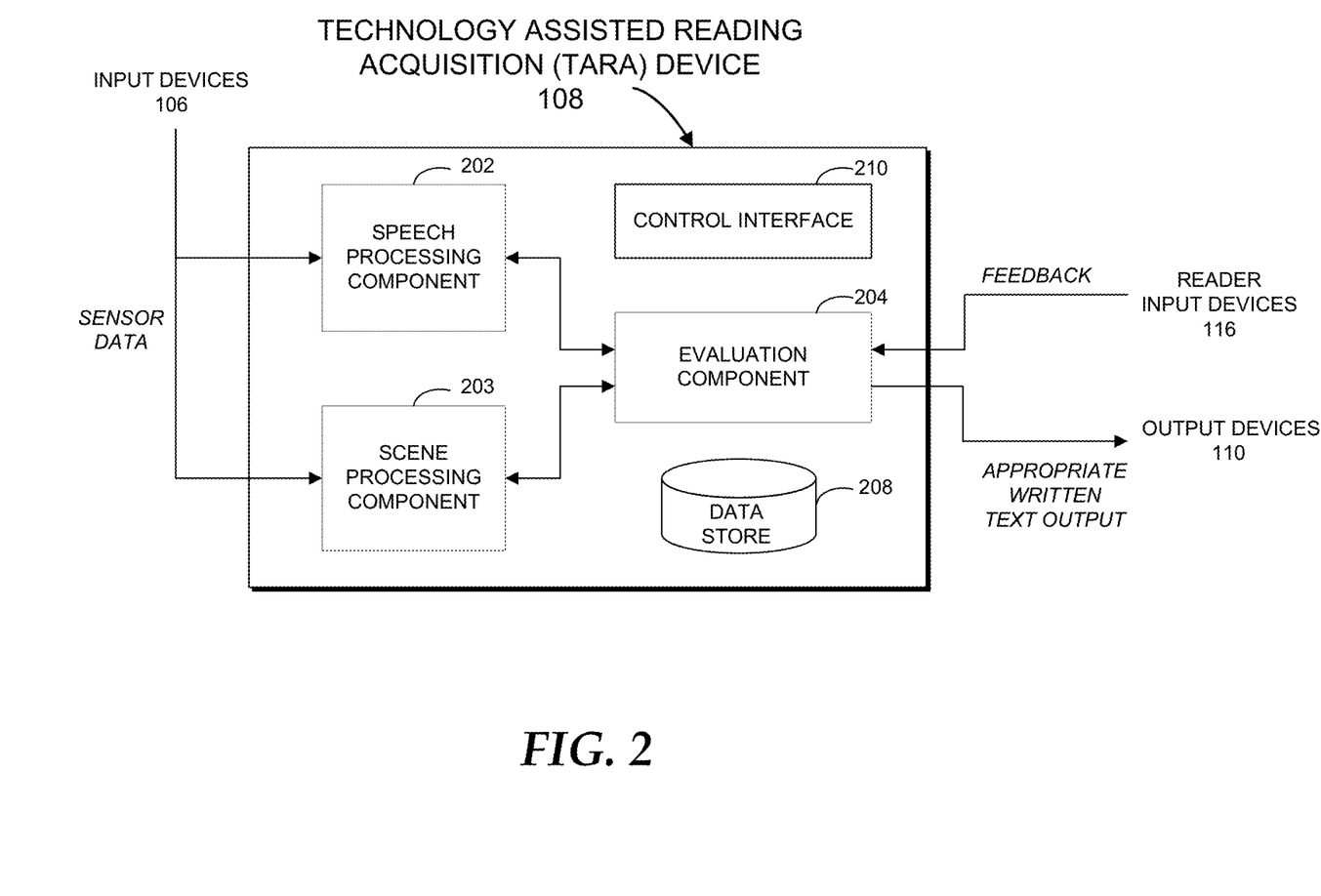
FIG. 2 is a block diagram of an exemplary technology assisted reading acquisition (TARA) device, in accordance with an embodiment of the subject invention.

FIG. 2 is a block diagram of an exemplary technology assisted reading acquisition (TARA) device, in accordance with an embodiment of the subject invention. Exemplary TARA device 108 includes a speech processing component 202 that receives and processes input data from one or more channels of sensor data output by one or more input devices 106. Speech processing component 202 analyzes the input data to determine which utterance, if any, is the most likely. In one embodiment, this analysis uses an optimal integration of the multiple channels of sensor data, in a manner prescribed by Bayesian analysis or Fuzzy Logic, which gives a set of likely utterances along with a confidence measure of each utterance. As an example, facial and gesture recognition and other sensor inputs are utilized to enhance understanding of the auditory speech. In addition, this processing in conjunction with information obtained from a data store 208 provides information to determine relevance to the child's interests and goals, and even the current meaningful experience of the child.

Exemplary TARA device 108 also includes a scene processing component 203 that receives and processes input sensor data from one or more input devices 106. Scene processing component 203 analyzes the input sensor data to determine which scene, if any, is the most likely. Analogous to the speech processing component, this analysis, in one embodiment, also uses an optimal integration, such as that prescribed by Bayesian analysis or Fuzzy Logic, which gives a set of likely scenes along with a confidence measure of each scene. Integration of multiple sensor inputs is utilized to enhance scene recognition, to determine relevance to the child's interests and goals, and even the importance of a current meaningful experience for the child.

TARA device 108 further includes an evaluation component 204 that receives the processed utterances from speech processing component 202 and processed scene data from scene processing component 203, and translates this processed data into an appropriate written text output. The evaluation component 204 uses a variety of information sources from data store 208 to determine the words and grammar to be presented as well as the physical characteristics (font, size, color) of the written text. As described in more detail below, the information stored in data store 208 may include but is not limited to the age and reading level of various individuals including that of reader 112, a characterization of perceptual, cognitive, and linguistic capabilities of individuals and of various reading levels, and presentation rules, such as text formatting and display rates, corresponding to different reading levels.

Evaluation component 204 provides formatted text to one or more output devices 110 for viewing by reader 112.

Data store 208 stores any or all of sensor data, intermediate or partial results, information about caregiver 102 and reader 112, as well as data and options provided using a control interface 210. Data store 208 may be provided by virtually any mechanism usable for storing and managing data, including but not limited to a file, a folder, a document, a web page or an application, such as a database management system.

Data store 208 may further represent a plurality of different data stores. For example, data store 208 may represent a presentation rule database, a cognitive database, and a vocabulary and grammar database. Further, data store 208 may also be provided by network storage or cloud storage in which the physical storage media is accessed across a network.

Control interface 210 refers to a user interface that enables an operator of TARA device 108 to select options and provide various types of control information. The operator of TARA device 108 may be caregiver 102, reader 112 or another person or persons. Control interface 210 may be provided by a graphical user interface with a user interacting via a mouse, touch screen or other input device, or by physical controls on TARA device 108 such as switches, buttons, thumbwheels and the like.

TARA device 108 also receives inputs from reader input devices 116 connected to the evaluation component 204. Reader input devices 116 enable reader 112 to provide feedback and to issue commands. Reader input devices may include a mouse, a keyboard, a touch screen or any other device that enables a user to provide information to TARA device 108.

Figure 3:
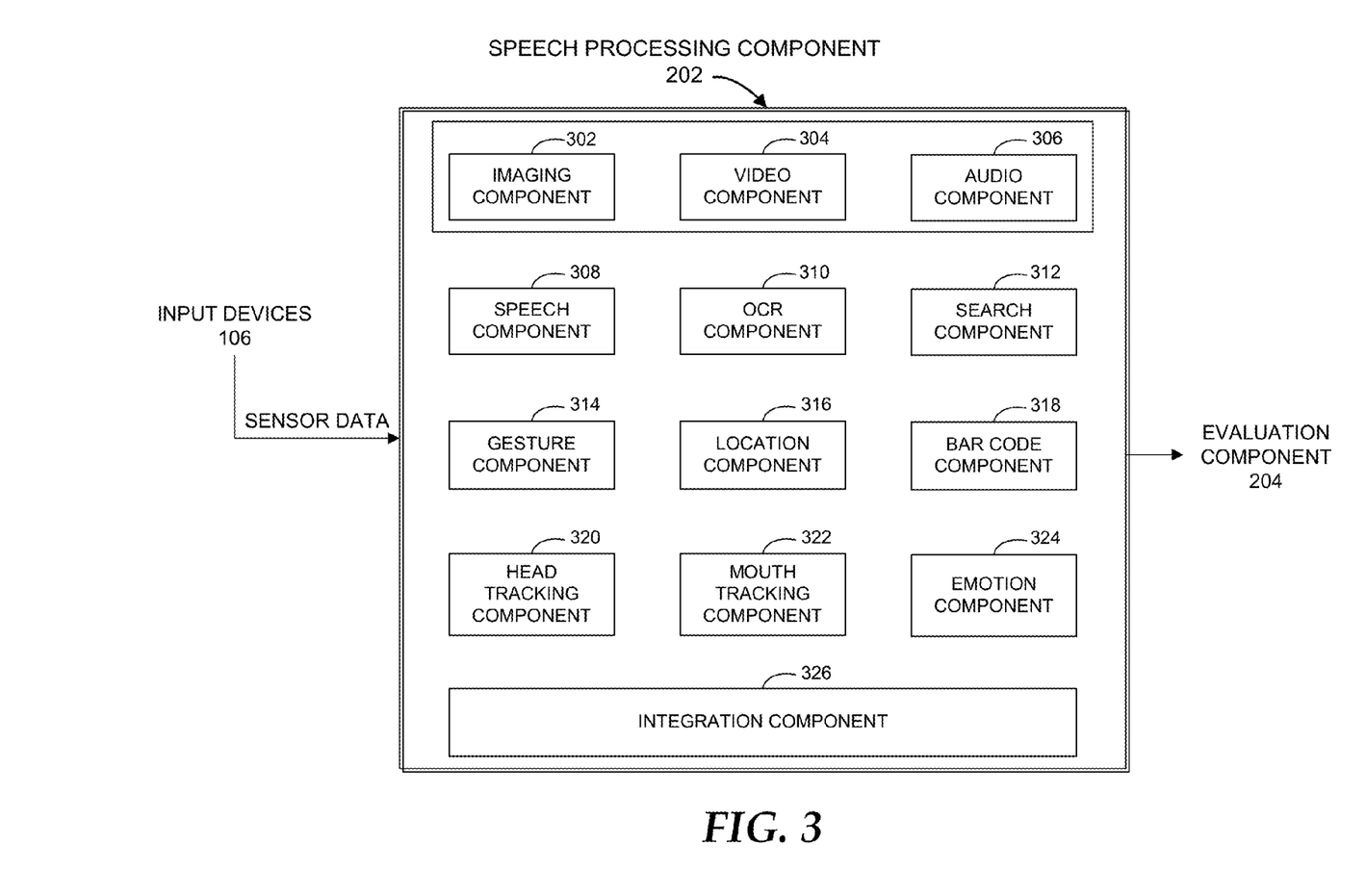
FIG. 3 provides a block diagram of a speech processing component that automatically recognizes a potentially meaningful experience that the child is having.

Now reference is made to FIG. 3, which provides a block diagram of a speech processing component, in accordance with an embodiment of the subject invention. Speech processing component 202 receives and processes one or more channels of sensor data from input devices 106.

Speech processing component 202 includes several sensor subsystems or components 302-306, each of which receives a channel of sensor data and processes the sensor data. These sensor components include imaging component 302, video component 304, and audio component 306.

Imaging component 302 processes incoming image sensor data, typically in the form of digital images in a standard format such as JPEG, from a digital camera or other image sensing device such as a mobile phone.

Video component 304 processes incoming video sensor data, typically digital frame data in a standard format such as MPEG2, MPEG4, or AVI from a camcorder, digital video camera, or smart phone.

Audio component 306 processes incoming audio sensor data, typically in the form of a standard analog or digital format from a microphone, voice recorder, or other similar device.

A speech component 308 processes any speech input captured by the imaging, video, and audio components. As described elsewhere, the main task performed by speech component 308 is automated speech recognition (ASR).

An optical character recognition (OCR) component 310 processes imaged text captured by the image component 302 and/or the video component 304, for example, to obtain written information. In one embodiment, a caregiver might be reading a book to a child, the text of the book is recognized via optical character recognition, and a modified form of the text is provided to a display device.

A search component 312 is provided that performs searches to improve the accuracy of the speech component. The search component accesses information about the talker, the characteristics of the talker's or similar talkers' speech, and algorithms for recognizing utterances. The information for the search is stored in data store 208.

Gesture component 314 processes the gestures of a person in caregiver and reader environment 104, as captured by imaging component 302 and/or video component 304. In a preferred embodiment, gestures of a talker are tracked to determine which person is most likely talking. This is used as an input to automated speech recognition performed by the speech component. In addition, different types of gestures used by the talker can be an additional source of information to help disambiguate what is actually being said.

A location component 316 determines the geographic location of caregiver 102, and/or the reader 112. In one embodiment, location information is used to determine whether the caregiver or reader is talking, and therefore, improve the accuracy of the spoken language. Location component 316 may use global positioning system (GPS) technology, and/or other suitable location technologies.

Bar code component 318 processes bar codes that are made available by the imaging and/or video components. In a preferred embodiment, a bar code attached to an object or to a person is decoded to obtain a description of the object or person's identity. This information can then provide contextual information that may be used in performing automated speech recognition.

Head tracking component 320 tracks head position captured by the imaging and video components. Determining the head and/or mouth movements of the talker can facilitate automated speech recognition.

Mouth tracking component 322 tracks mouth position and movements captured by the imaging and video components. In one embodiment, mouth positions, which are systematically related to different utterances, are used to in performing automated speech recognition.

An emotion component 324 analyzes image, video and audio input data to extract emotion content. Automated emotion recognition follows a very similar algorithm as that used in automated speech recognition. There are identifiable signatures in the sensor inputs that characterize different emotions, which can be retrieved by search component 312, and used to improve emotion recognition.

An integration component 326 integrates or combines all of the information captured by the imaging, video, and audio components and processed by the other components. In one embodiment, an optimal integration, such as that prescribed by Bayesian analysis or Fuzzy Logic, is used. Combining all available components in this manner typically improves the accuracy of utterance recognition by speech processing component 202.

Figure 4:
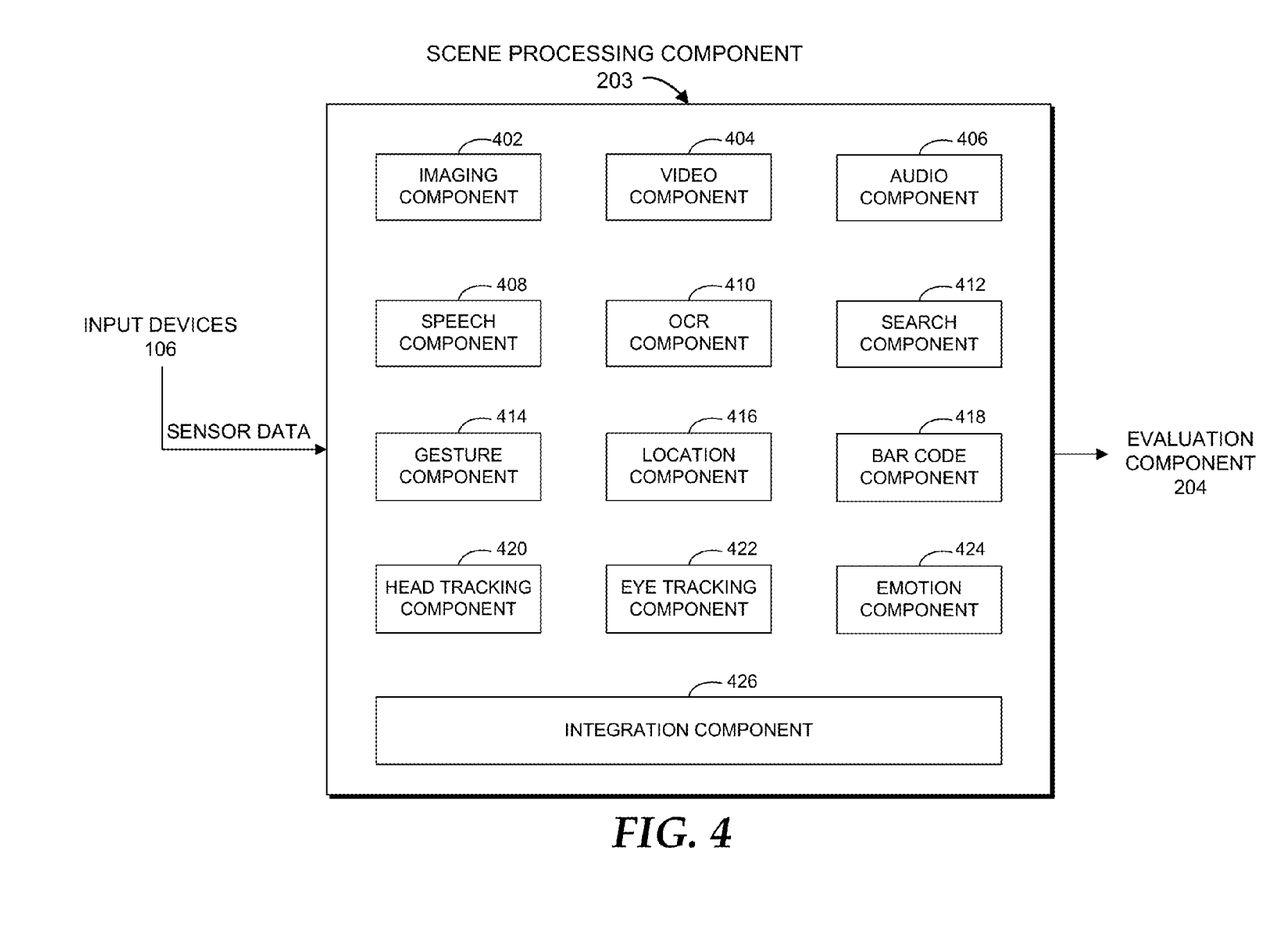
FIG. 4 provides a block diagram of a scene processing component that automatically recognizes a potentially meaningful experience that the child is having, in accordance with an embodiment of the subject invention.

FIG. 4 provides a block diagram of a scene processing component 203, in accordance with an embodiment of the subject invention. Analogous to speech processing component 202, scene processing component 203 receives and processes one or more channels of input sensor data, to assist with automatic recognition of the child's meaningful experience.

Imaging component 402, video component 404, and audio component 406 operate identically to their respective counterparts in FIG. 3 and have the same descriptions given in reference to FIG. 3.

A speech component 408 processes any speech input captured by the imaging, video, and audio components. In a preferred embodiment, who is talking and what is being said is used to facilitate scene processing.

An optical character recognition (OCR) component 410 processes imaged text captured by the image component 402 and/or the video component 404. For example, text from a posted sign could be used to facilitate recognition of an object and/or a scene.

A search component 412 is provided that performs searches to improve the accuracy of the scene processing component. Some of the information for the search may be stored in data store 208.

Search component 412 obtains information about typical scenes, objects, and actions that is used by integration component 426 to recognize the most likely current meaningful experience of reader 112.

Gesture component 414 processes user gestures as captured by imaging component 302 and/or video component 304. In a preferred embodiment, gestures of persons are tracked to facilitate the recognition of the scene, objects, and actions which in turn improves recognition of the most likely current meaningful experience of reader 112.

A location component 416 determines the geographic location of caregiver 102 and reader 112. Location component 416 may use global positioning system (GPS) technology, and/or other suitable location technologies. For example, location component 416 can indicate whether the caregiver and child are side-by-side or in separate locations in the room. This information is then used by scene processing component 203 to determine whether or not the child's current meaningful experience is being shared with the caregiver.

Bar code component 418 processes bar codes that are made available by the imaging and/or video components. In a preferred embodiment, a bar code may be attached to an object or to a person that encodes identity information. This information can then be used to improve the accuracy of the scene processing system. Also, the encoded bar code information can be presented in an appropriate written form to reader 112.

Head tracking component 420 tracks head position captured by the imaging and video components. Determining the head and eye fixation of reader 112 is important information about the current meaningful experience of reader 112. As an example, if it is determined that reader 112 is looking directly at a toy red car, the written words TOY CAR or RED CAR might be displayed.

Eye tracking component 422 tracks eye fixation position and movements captured by the imaging and video components.

An emotion component 424 analyzes image, video and audio input data to extract emotion content. Automated emotion recognition contributes to scene processing. In one embodiment, emotion is analyzed and is used to determine the presentation format to use for written text that represents the emotion in the current meaningful experience. For example, a high valence, or high activity, event, such as a caregiver dancing might result in the written word DANCE being displayed in a red vibrating font. A low valence, or low activity, event such as a caregiver sleeping might result in the written word SLEEP being displayed in a steady blue font.

Analogous to integration component 326 in FIG. 3, integration component 426 integrates or combines all of the information captured by the imaging, video, and audio components but in this case for scene processing. Information provided by components of scene processing component 203 are integrated to recognize the child's most likely current meaningful experience. It may be appreciated that each of input devices 106 may capture information from caregiver and reader environment 104 independently. Thus, each sensor data stream represents a set of possible alternatives for the child's current meaningful experience. Integration component 426 combines or integrates these to provide a set of possible alternatives for the child's current meaningful experience. Each of the alternatives is weighted according to a degree of confidence that it is meaningful, in the case of speech, or significant, in the case of scene. This analysis involves an optimal integration, carried out by integration component 426, such as that prescribed by Bayesian analysis or Fuzzy Logic, which analyzes the set of likely alternatives along with a confidence measure of each alternative. If a confidence assigned to a given alternative exceeds a preset threshold value, then the corresponding alternative is mapped into a meaningful utterance or a significant action.

Figure 5:
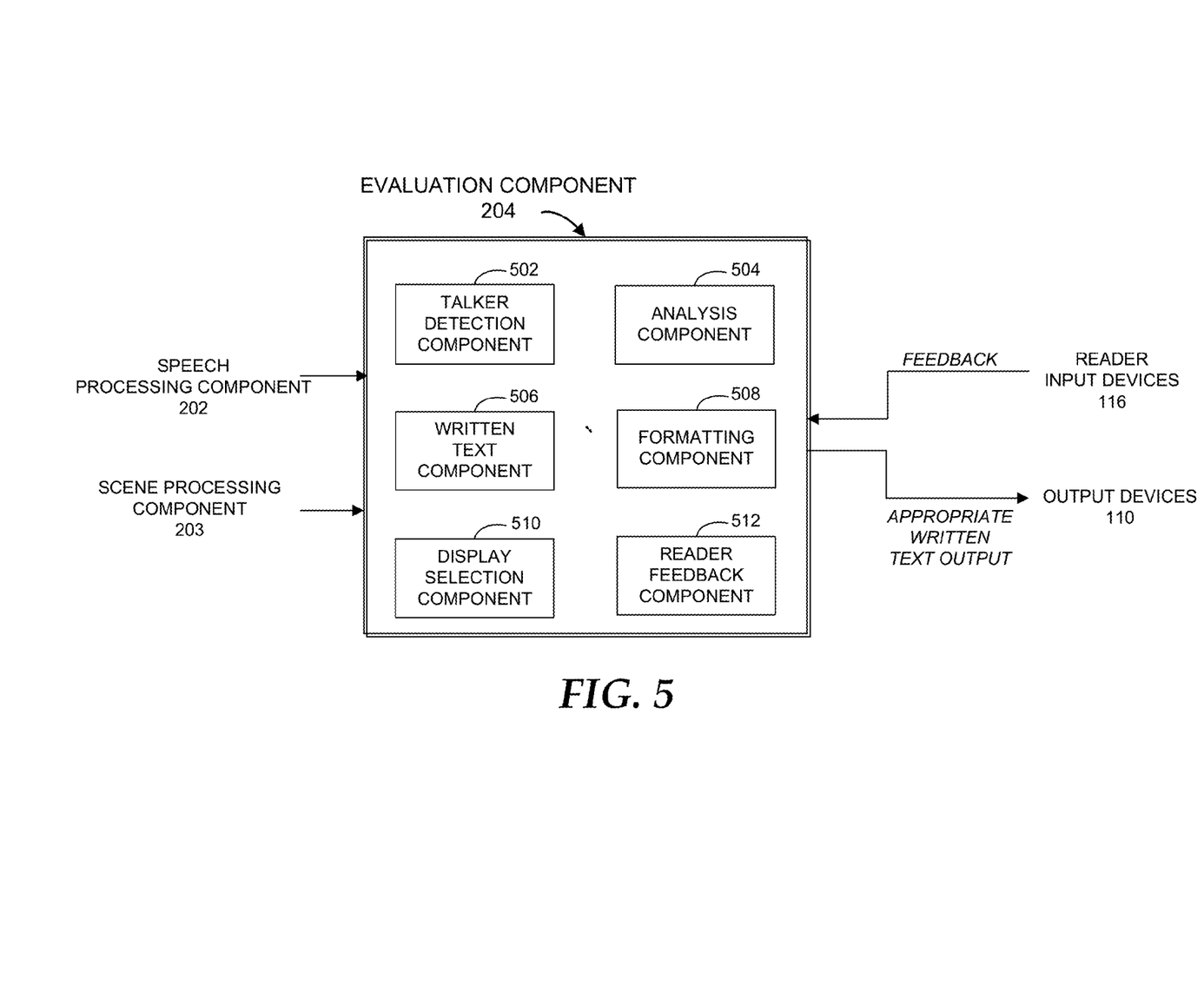
FIG. 5 provides a block diagram of an evaluation component for computing and presenting written text for reading based on input from the speech processing and the scene processing components, in accordance with an embodiment of the subject invention.

FIG. 5 provides a block diagram of an evaluation component 204 for computing and presenting written text for reading based on input from speech processing component 202 and scene processing component 203, in accordance with an embodiment of the subject invention. Evaluation component 204 receives input from speech processing component 202 and scene processing component 203 and analyzes these inputs to determine a best guess for the current meaningful experience for reader 112.

It generates an appropriate written rendition of this meaning and provides it to one of output devices 110 for viewing by reader 112.

Evaluation component 204 separately processes speech inputs from speech processing component 202 and scene information from scene processing component 203. For example, for speech processing, evaluation component 204 includes a talker detection component 502 that determines which of caregiver 102, or reader 112 is talking or if another person is talking. For scene processing, talker detection component 502 determines whether the caregiver, child, or another person is performing a significant action.

For speech processing, an analysis component 504 determines which utterances are possible given input from speech processing component 202. Analysis component 504 also computes a confidence value for each of the possible utterances. For scene processing, analysis component 504 determines which actions are possible and computes a degree of confidence for each possible action.

A written text component 506 receives encoded utterances or encoded actions from analysis component 504 and determines the actual words to be presented. No words are determined if none of the confidence values corresponding to the utterances or actions provided by analysis component 504 fall below a confidence threshold. Written text component 506 uses information about reader 112, maintained in data store 208, to determine the most appropriate words and grammar for reader 112. For example, analysis component 504 may determine that a possible utterance with a high confidence value is that caregiver 102 is showing an eight-month-old reader 112 a red toy car. In this case written text component 506, using information about reader 112, specified in data store 208, determines that only the word CAR should be provided to output devices 110 for display. If the child were 14 months old, on the other hand, the written text component might determine that the words TOY CAR should be provided to output devices 110 for display.

Table 1, below, provides an example list of reader characteristics that may be used to determine what words and grammar to present after determination of a meaningful utterance or a significant action. Although the rules are based on age and reading level, the actual determination is also based on the perceptual, cognitive, and linguistic characteristics of the child, which will vary across different children.

As described herein, written text component 506 uses information stored in data store 208 about the individual caregiver, child, and situation to determine the actual words to be presented. In the first year or so of life, children tend to speak single word utterances. Single word displays might thus be most optimal to present. As the child's linguistic competency develops, the written displays are made more complex in terms of the number of words presented and their grammatical structure. In one embodiment this information is summarized as rules. An example set of such rules is given below in Table 1.

TABLE 1

Rules for determining words and grammar appropriate for a reader.

| Reader Age/Reading Level | Words and Grammar Characteristics |
|---|---|
| 6-12 months/Novice | Single Words or Syllables Only Content Words Presented |
| 13-18 months/Less Novice | Multiple Words or Syllables Only Content Words Presented |
| 19-30 months | Multiple Words or Syllables Content Words and some Function Words Presented |
| 31-42 months | Multiple Words or Syllables Content Words and some Function Words Presented |
| 43-54 months/Near Expert | Multiple Words Most Words Presented Fairly Short Presentation Duration |
| 55-66 months/Expert | Multiple Words All Words Presented |

A formatting component 508 determines the characteristics of the letters and words to be displayed. Formatting component 508 uses information about reader 112, obtained from data store 208, to determine the most appropriate format for reader 112. Following the previous example, written text component 506 specifies that only the word CAR should be provided as output on the display. Using information about the child specified in data store 208, formatting component 508 may determine that the word "car" should be written in large, dynamic, colored, uppercase letters on the display in the child's range of view. This dynamic colorful display is meant to capture and maintain the child's attention to the written text. If reader 112 is 14 months old, however, written text component 506 may specify that the two words TOY CAR should be presented. Formatting component 508 might analogously determine that the two words should be presented successively one word at a time for a duration of 1 second per word. The words might also be presented in simple black uppercase letters. As illustrated herein, TARA device 108 adapts the written presentation to the putative reading level of the reader 112, using information about the child specified in the data store 208.

Formatting component 508 uses information stored in data store 208 about the individual caregiver, child, and situation to determine the visual properties of the letters that make up each word, the number of words presented in the display, the rate of presentation of successive displays containing the written output. The display of written language is chosen to conform to the perceptual, cognitive, and linguistic constraints of the child. For example, in the first month of life, a child can distinguish only the top letter on a reading chart but reaches near adult levels by 8 months. Infants' temporal resolution (the identity and order of changing images) is also well below that of adults. These constraints, or rules, are used to determine the size and duration of characters to be presented to children of different ages and different perceptual, cognitive and linguistic levels.

Formatting component 508 also determines from a child's reading level that perhaps a sequence of words (or perhaps syllables or phrases) should be presented successively on a single line in a fixed window.

If temporally successive letters, syllables, or words are presented one after another in a fixed reading window, the rate of presentation may be adapted to the perceptual capabilities of the child. Given that children read more slowly than adults, the rate of presentation for the targeted readers would be about 1 word per second. A literate adult would be capable of reading the words at 4 times this rate. In one embodiment, such information is formulated as a set of rules, stored in data store 208, and is used by formatting component 508 to determine the appropriate display parameters for a given child.

Although it is expected that children will learn about letters by simply seeing written words, formatting component 508 also provides options to embellish the written text with font, size, and color differences. As examples, consonants might be one color and vowels another, nouns and verbs could be different sizes, and closed grammatical categories (e.g., prepositions) could be presented in different type fonts. In addition, words might be segmented into syllable boundaries, separated by hyphen signs, or presented one syllable per display. The various options may be stored in data store 208 and used by formatting component 508 along with child-specific information that would be automatically learned and updated, or entered by a person operating TARA device 108.

In addition, formatting component 508 may issue commands to accompany or precede written text by an auditory signal and/or a visual pulsating pattern on the display to capture the attention of reader 112.

Table 2, below, gives examples of formatting rules for each of the first five years of a child's life that may be applied in determining the presentation of the written text. For example, a younger less experienced child would be shown larger and more colorful fonts at a slower rate of presentation.

TABLE 2

Formatting rules for determining presentation of written text.

| Reader Age/Reading Level | Presentation Characteristics |
|---|---|
| 6-12 months/Novice | Use only uppercase letters |
| | Very Large Font |
| | Dynamic Display of Letters |
| | Colorful Letters |
| | Narrow Reading Window |
| | Long Presentation Duration |
| 13-18 months/Less Novice | Use only uppercase letters |
| | Large Font |
| | Dynamic Display of Letters |
| | Colorful Letters |
| | Narrow Reading Window |
| | Long Presentation Duration |
| 19-30 months | Large Font |
| | Dynamic Display of Letters |
| | Colorful Letters |
| | Narrow Reading Window |
| | Long Presentation Duration |
| 31-42 months | Large Font |
| | Less Dynamic Display of Letters |
| | Less Colorful Letters |
| | Less Narrow Reading Window |
| | Shorter Presentation Duration |
| 43-54 months/Near Expert | Somewhat Smaller Font |
| | More Static Display of Letters |
| | Fairly Plain Letters |
| | Wider Reading Window |
| | Fairly Short Presentation Duration |
| 55-66 months/Expert | Smaller Font |
| | Static Display of Letters |
| | Plain Letters |
| | Wide Reading Window |
| | Short Presentation Duration |

In the case that multiple output devices 110 are in use, a display selection component 510 selects one of output devices 110 on which to present written text to reader 112. In one example, scene processing component 203 may have determined that the reader 112 is in the vicinity of one physical display rather than another. Thus, the display selection component 510 would use this information to select the display near the child. If the caregiver, for example, is carrying a portable computing device for either automated speech processing and/or scene processing, it would be straightforward to have the text presented on its display screen. The screen could be held in place by a light-weight vest that the caregiver would wear, and easily seen by the reader 112. It is also possible for caregiver 102 or another user, using control interface 210, to manually select which display will be used to present the appropriate written text.

A reader feedback component 512 accepts inputs from reader input devices 116 and responds appropriately. For example, reader feedback component 512 may allow reader 112 to interact with the written text by touching or otherwise manipulating the output display. As an example, the output display might have a touch-sensitive display which allows the child to touch it to issue a command to re-display text. Other controls may enable reader 112 and/or the caregiver 102 to perform other manipulations that can vary the written presentation and/or to include other sensory inputs such as associating the written language with spoken or sign language.

Figure 6:
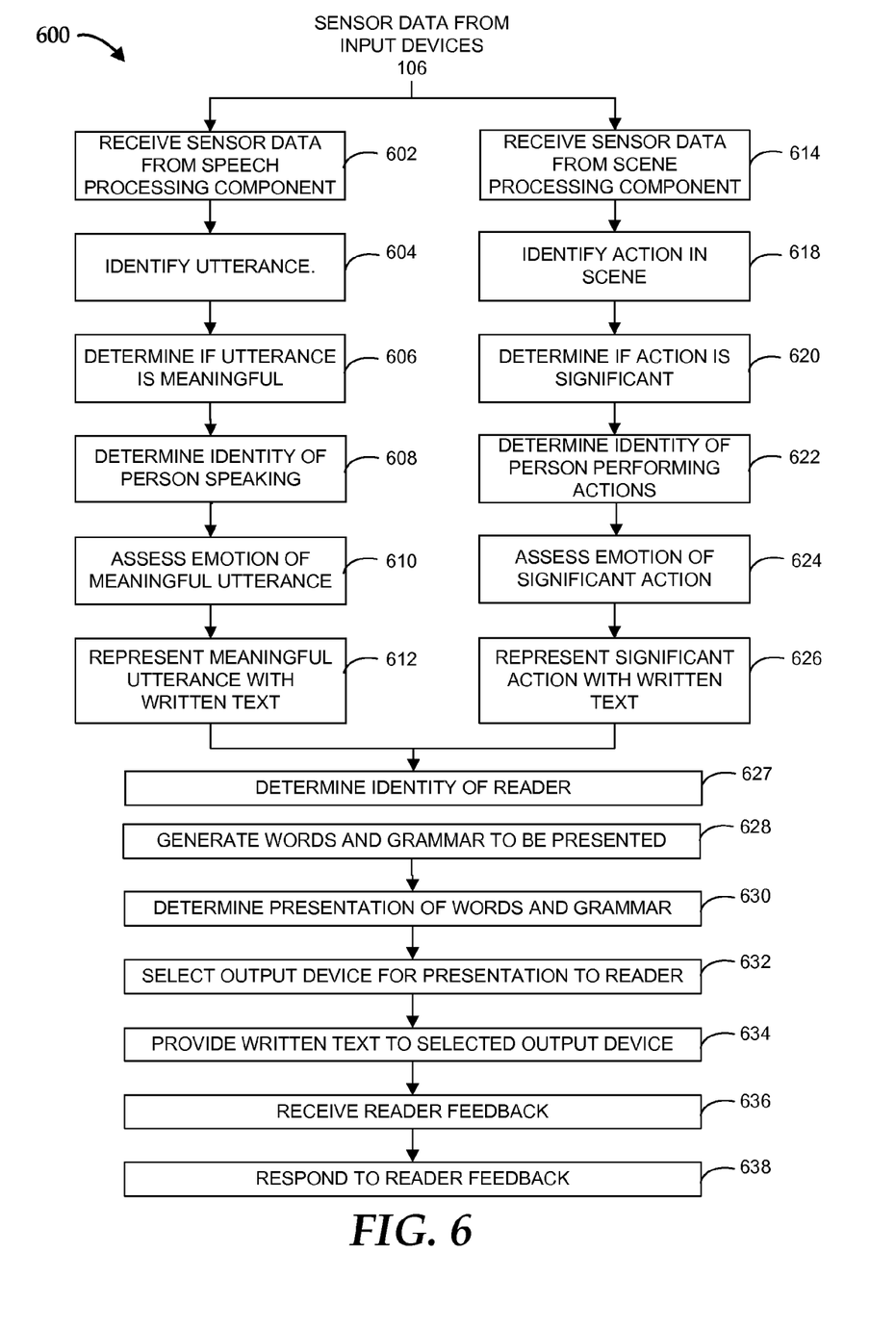
FIG. 6 is a flow diagram that describes an overall method for receiving speech and scene information, analyzing the information, determining the appropriate written text to output to a visual display, and receiving feedback from users, in accordance with an embodiment of the subject invention.

FIG. 6 is a flow diagram that describes an overall method for receiving speech and scene information, analyzing the information, determining the appropriate written text to output to a visual display, and receiving feedback from users, in accordance with an embodiment of the subject invention. In one embodiment, steps 602-612 on the left of the diagram are performed by speech processing component 202 in parallel with the processing of steps 614-626 by scene processing component 203. In other embodiments only speech processing component 202 or scene processing component 203 may be operational at a given time.

At step 602, sensor data is received from one or more of input devices 106 by speech processing component 202. At step 604, an utterance is identified 604 from the sensor data input. At step 606 a determination is made as to whether the identified utterance is meaningful.

In one embodiment, if the utterance is determined to be meaningful then a modified written version of it will be presented on one of output devices 110, whereas if it is determined not to be meaningful the utterance is discarded. Thus, in this embodiment, further steps are only performed for a meaningful utterance, i.e. an utterance that is determined to be meaningful at step 606.

At step 608 the identity of reader 112 is determined. At step 610 the emotion of the meaningful utterance is assessed. At step 612 the meaningful utterance is represented in written language text. This representation is the best guess of TARA device 108 as to the meaning of the utterance.

At step 614, sensor data is received from one or more of input devices 106 by scene processing component 203. At step 618 any action currently occurring in the scene is identified. At step 620 a determination is made as to whether a current action identified in step 618 is significant. In one embodiment, if the action is determined to be significant then an appropriate written description of it will be presented on one of output devices 110, whereas if it is determined not to be meaningful the action is discarded. Thus, in this embodiment, further steps are only performed for a significant action, i.e. an action that is determined to be significant at step 620. At step 622 the identity of the person that performed the action is determined.

At step 624, any emotion present in the significant action is assessed. Then, at step 626, the significant action is represented in written language.

In one embodiment, processing steps 628-638 are initiated by determination of either or both of a meaningful utterance or a significant action. At step 628 the words and grammar, for either or both of a previously determined meaningful event or significant action, are generated at a level appropriate to the perceptual, cognitive, and linguistic capabilities of the identified reader 112. At step 630 the presentation format of the words and grammar generated at step 628 are determined. At step 632, one or more of output devices 110 are selected on which to display the written text. At step 634, the written text is provided to the selected output device. At step 636 feedback is received from one or more of reader input devices 116. A response to the feedback is provided, if appropriate, at step 638.

Figure 7:
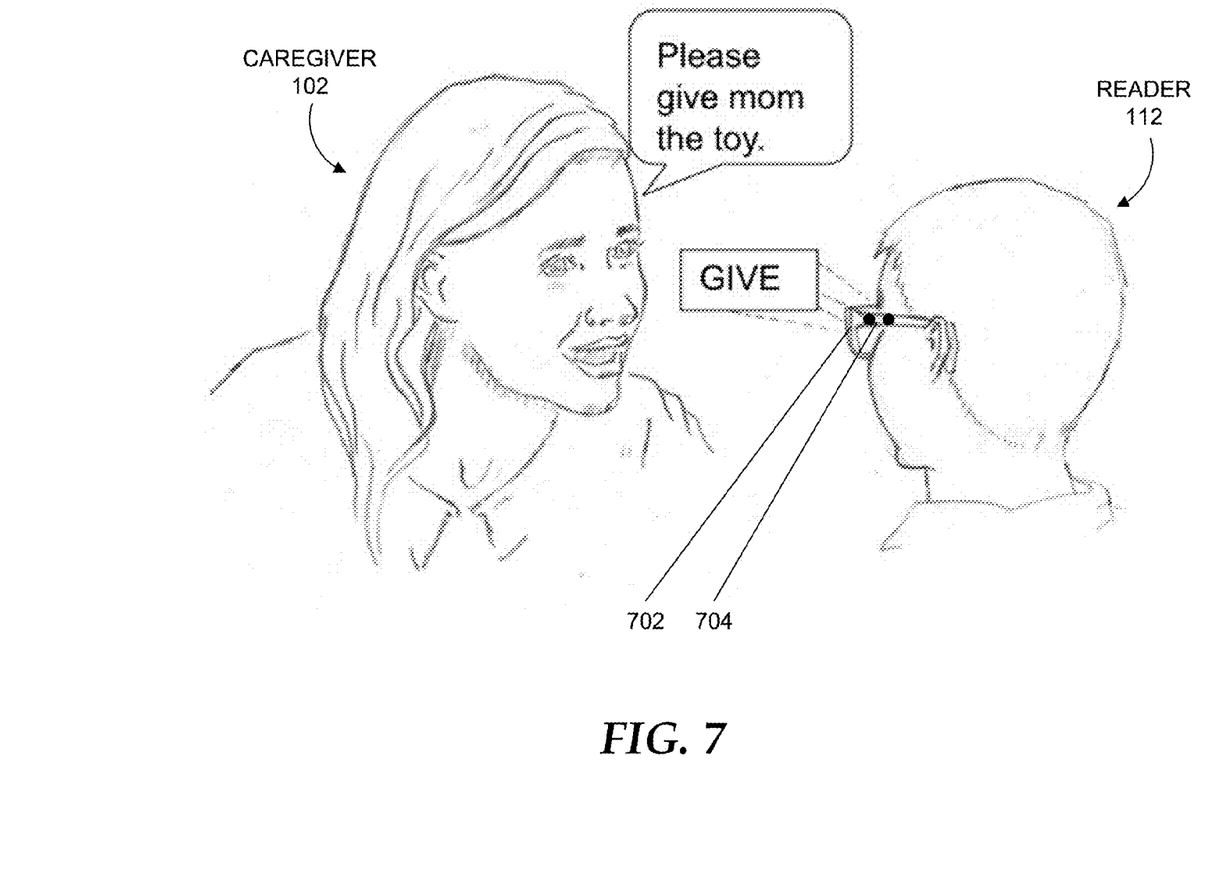
FIG. 7 illustrates a caregiver and a child using the subject invention, in accordance with an embodiment of the subject invention.

FIG. 7 illustrates a caregiver 102 using the subject invention with a child reader 112, in accordance with an embodiment of the subject invention. In the example, text is output from TARA device 108 to output devices 110, embodied as an augmented head-up display 702, which appears in FIG. 7 as glasses worn by a reader 112 in which the text is superimposed on the normal view of the scene. Caregiver 102 is saying "Please give mom the toy." and the processed text output by TARA device 108 to the glasses is "GIVE." In this example, two microphones 704 embedded in the temple of the head-up display serve as input devices 106. In this embodiment output device 110 is worn by the child, i.e. by reader 112 who is a child in this example.

Figure 8:
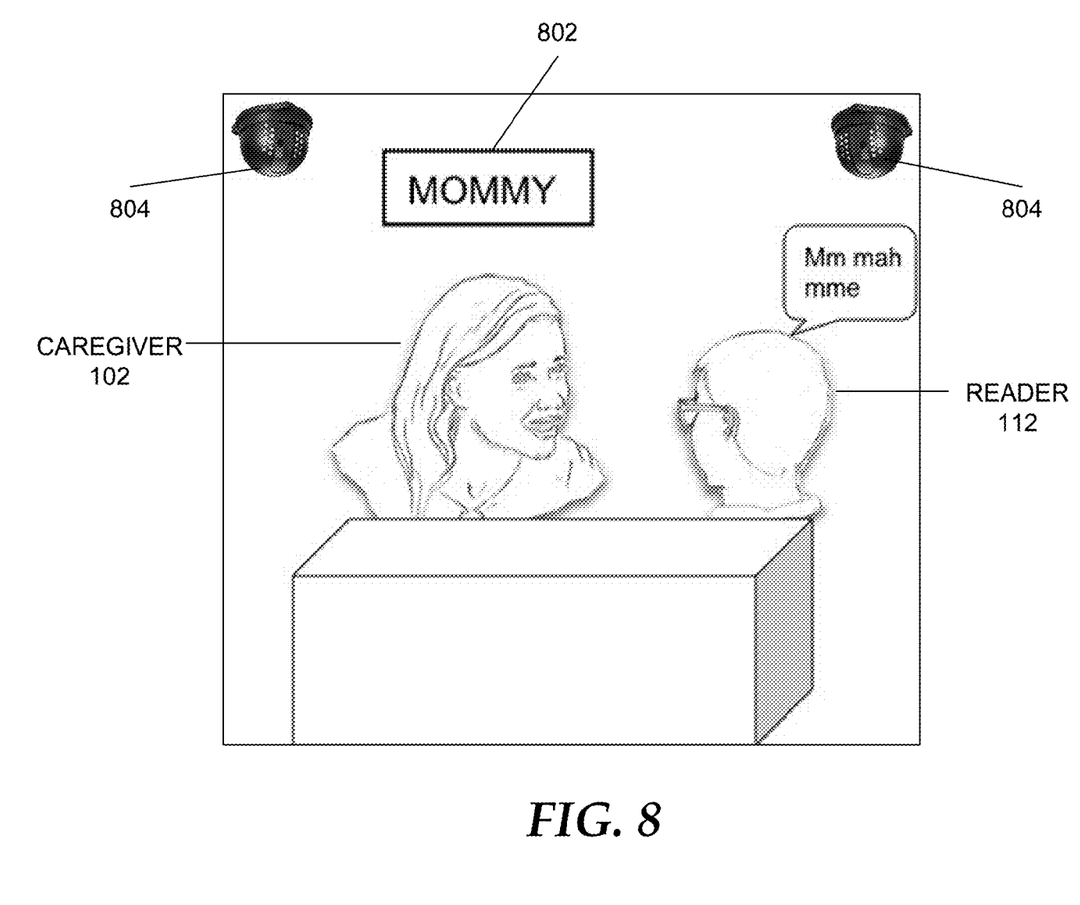
FIG. 8 illustrates a room with a caregiver using the subject invention with a child, in accordance with an embodiment of the subject invention.

FIG. 8 illustrates a room with a caregiver 102 using the subject invention with a child reader 112, in accordance with an embodiment of the subject invention. In this example, output devices 110 is a projection display 802 on the wall of the room to be read by reader 112, the child. The child is saying "Mm mah mme," and is also seeing the written text "MOMMY" on projection display 802. Two video cameras with microphones 804 are shown attached to the upper corners of the wall.

Given the above description with hypothetical examples, it is understood that persons skilled in the art will agree that there are several embodiments that follow the methods, devices and systems described.

What is claimed is:

1. A computer-implemented method for technology assisted reading acquisition comprising a caregiver and reader environment, at last one input device, at least one output device, a speech processing component, a scene processing component, at least one reader input device, an evaluation component, and a control interface, the method for enabling a child to learn to read, the method comprising:

maintaining a data store comprising information that characterizes (i) caregivers, readers, and properties of caregiver and reader environment, (ii) vocabulary and grammar used by children of different reading levels, and (iii) text formatting appropriate to children of different reading levels;

receiving a stream of sensor data from one or more input devices, the stream of sensor data representing (1) speech of a first person, and (2) characteristics of a second person, wherein the second person is a reader and is a different person than the first person, wherein the reader is a child;

identifying a meaningful utterance spoken by the first person from the stream of sensor data received by the speech processing component;

determining an identity of the child, based at least in part on information in the data store, the stream of sensor data received by the speech processing component or scene processing component;

determining the reading level of the child based on information in the data store;

representing the meaningful utterance in written text that consists of vocabulary and grammar appropriate to the determined reading level of the child using the information in the data store that characterizes vocabulary and grammar for the child;

formatting the written text appropriate to the determined reading level of the child using the information in the data store that characterizes text formatting for the child;

providing the written text to a display device for presentation to the child;

receiving feedback from the child via at least one child input device; and responding to feedback from the child via at least one output device.

2. The method of claim 1, wherein the information in the data store that characterizes vocabulary and grammar includes rules to apply when representing the meaningful utterance in the written text that are based on the determined reading level of the child and representing the meaningful utterance in the written text is based in part on the rules.

3. The method of claim 1, wherein the information in the data store that characterizes text formatting comprises rules for formatting written text based on the determined reading level of the child, wherein formatting the written text comprises determining a presentation format of the written text based on the rules for formatting written text in the data store, and wherein delivering the written text to a display device includes providing the presentation format of the written text.

4. The method of claim 3, wherein the rules for formatting written text are also based on an emotion, further comprising:
assessing the emotion in the meaningful utterance based on an emotion component; and
wherein determining the presentation format is additionally based on the assessed emotion in the meaningful utterance.

5. The method of claim 1, further comprising selecting the display device from a plurality of display devices.

6. The method of claim 1, further comprising receiving commands via the input device from the first person or the second person.

7. The method of claim 1, wherein the sensor data includes image data describing visual characteristics of a physical surrounding of the first person and the second person, further comprising:
detecting a bar code via a bar code component from the image data;
decoding the bar code to obtain textual information; and
including some or all of the obtained textual information in the written text based on information in the data store.

8. The method of claim 1, wherein the sensor data includes a sequence of images that represent the first person, and wherein identifying the meaningful utterance is performed in part using face and gesture recognition on the sequence of images.

9. A computer-implemented method for technology assisted reading acquisition comprising a caregiver and reader environment, at last one input device, at least one output device, a speech processing component, a scene processing component, at least one reader input device, an evaluation component, and a control interface, the method for enabling a child to learn to read, the method comprising:
maintaining a data store comprising information that characterizes (i) caregivers, readers, and properties of caregiver and reader environment, (ii) vocabulary and grammar used by children of different reading levels, and (iii) text formatting appropriate to children of different reading levels;
receiving a stream of sensor data from one or more input devices, the stream of sensor data representing a sequence of scenes, each scene including a reader, wherein the reader is a child;
identifying a meaningful scene from the stream of sensor data received by the scene processing component;
determining an identity of the child in the meaningful scene, based at least in part on information in the data store, the stream of sensor data received by the speech processing component or scene processing component;
determining the reading level of the child based on information in the data store;
representing the meaningful scene in written text that consists of vocabulary and grammar appropriate to the determined reading level of the child using the information in the data store that characterizes vocabulary and grammar for the child;
formatting the written text appropriate to the determined reading level of the child using the information in the data store that characterizes text formatting for the child;
providing the written text to a display device for presentation to the child;
receiving feedback from the child via at least one child input device; and
responding to feedback from the child via at least one output device.

10. The method of claim 9, wherein the information in the data store that characterizes vocabulary and grammar includes rules to apply when representing the meaningful scene in written text that are based on the determined reading level of the child and representing the meaningful scene in written text is based in part on the rules.

11. The method of claim 9, wherein the information in the data store that characterizes text formatting comprises rules for formatting written text based on the determined reading level of the child, wherein formatting the written text comprises determining a presentation format of the written text based on the rules for formatting written text, and wherein providing the written text to a display device includes providing the presentation format of the written text along with the written text.

12. The method of claim 11, wherein the rules for formatting written text are also based on an emotion, further comprising:
assessing the emotion in the meaningful utterance based on an emotion component; and
wherein determining the presentation format is additionally based on the assessed emotion in the meaningful utterance.

13. The method of claim 9, further comprising selecting the display device from a plurality of display devices.

14. The method of claim 9, further comprising receiving commands via the input device from a person in the scene.

15. The method of claim 9, wherein the sensor data includes image data, further comprising:
detecting a bar code via a bar code component from the image data;
decoding the bar code based on information in the data store to obtain textual information; and
including some or all of the obtained textual information in the written text.

16. The method of claim 9, wherein the sensor data includes image data, further comprising:
performing optical character recognition on the image data to detect text; and
including some or all of the detected text in the written text.

17. The method of claim 1 or 9, wherein at least one of the input devices is selected from the group consisting of a digital video camera, a digital camera, and a microphone.

18. A computer-implemented method for technology assisted reading acquisition comprising a caregiver and reader environment, at last one input device, at least one output device, a speech processing component, a scene processing component, at least one reader input device, an evaluation component, and a control interface, the method for enabling a child to learn to read, the method comprising:
maintaining a data store comprising information that characterizes (i) caregivers, readers, and properties of caregiver and reader environment, (ii) vocabulary and grammar used by children of different reading levels, and (iii) text formatting appropriate to children of different reading levels;

receiving a stream of sensor data from one or more input devices, the stream of sensor data representing speech of a child;

identifying a meaningful utterance spoken by the child from the stream of sensor data received by the speech processing component;

determining an identity of the child based at least in part on information in the data store, the stream of sensor data received by the speech processing component or scene processing component;

determining the reading level of the child based on information in the data store;

representing the meaningful utterance in written text that consists of vocabulary and grammar appropriate to the determined reading level of the child using the information in the data store that characterizes vocabulary and grammar for the child;

formatting the written text appropriate to the determined reading level of the child using the information in the data store that characterizes text formatting for the child;

providing the written text to a display device for presentation to the child;

receiving feedback from the child via at least one child input device; and responding to feedback from the child via at least one output device.

19. The method of claim 18, wherein the information in the data store that characterizes vocabulary and grammar includes rules to apply when representing the meaningful utterance in written text that are based on the determined reading level of the child and representing the meaningful utterance in written text is based in part on the rules.

20. The method of claim 18, wherein the information in the data store that characterizes text formatting comprises rules for formatting written text based on the determined reading level of the child, wherein formatting the written text comprises determining a presentation format of the written text based on the rules for formatting written text, and wherein providing the written text to a display device includes providing the presentation format of the written text.

21. The method of claim 20, wherein the rules for formatting written text are also based on an emotion, further comprising:

assessing the emotion in the meaningful utterance based on an emotion component; and wherein determining the presentation format is additionally based on the assessed emotion in the meaningful utterance.

22. The method of claim 18, further comprising selecting the display device from a plurality of display devices.

* * * * *